United States Patent
Perner

(10) Patent No.: US 7,313,732 B2
(45) Date of Patent: Dec. 25, 2007

(54) MEMORY ARRANGEMENT IN A COMPUTER SYSTEM

(75) Inventor: Martin Perner, München (DE)

(73) Assignee: Infineon Technologies AG, Neubiberg (DE)

( * ) Notice: Subject to any disclaimer, the term of this patent is extended or adjusted under 35 U.S.C. 154(b) by 495 days.

(21) Appl. No.: 10/902,160

(22) Filed: Jul. 30, 2004

(65) Prior Publication Data

US 2005/0028040 A1    Feb. 3, 2005

(30) Foreign Application Priority Data

Jul. 31, 2003    (DE) ................. 103 35 132

(51) Int. Cl.
*G06F 11/00*    (2006.01)
(52) U.S. Cl. .......................... 714/42; 714/54
(58) Field of Classification Search ............ 714/42, 714/54, 5
See application file for complete search history.

(56) References Cited

U.S. PATENT DOCUMENTS

| | | | |
|---|---|---|---|
| 4,858,133 A * | 8/1989 | Takeuchi et al. ............... 701/35 |
| 5,036,487 A * | 7/1991 | Karetsos et al. ............... 365/51 |
| 5,119,376 A * | 6/1992 | Badaoui et al. ............. 370/522 |
| 5,727,182 A * | 3/1998 | Fukushima et al. ......... 711/115 |
| 2001/0025354 A1 | 9/2001 | Doll et al. | |
| 2004/0082121 A1 | 4/2004 | Perner | |
| 2004/0100246 A1 | 5/2004 | Perner | |
| 2005/0170673 A1 * | 8/2005 | Choi ........................... 439/65 |

FOREIGN PATENT DOCUMENTS

| | | |
|---|---|---|
| WO | WO 97/31315 A1 | 8/1997 |
| WO | WO 98/36356 A1 | 8/1998 |
| WO | WO 01/93042 A2 | 12/2001 |

OTHER PUBLICATIONS

Gumm, H.P. et al.; "Der CPU-Simulator MikroSim"; Philipps-Universität Marburg; 8 pages, unknown date.
Jarwala, N.; "Designing "Dual Personality" IEEE 1149.1 Compliant Multi-Chip Modules"; International Test Conference 1994; pp. 446-455.

* cited by examiner

*Primary Examiner*—Dieu-Minh Le
(74) *Attorney, Agent, or Firm*—Edell, Shapiro & Finnan, LLC

(57) ABSTRACT

A memory arrangement in a computer system can have at least one memory module with semiconductor components, which are arranged on the memory module, can be operated in parallel and are additionally connected to one another via a serial line. The memory arrangement can have an interface bus for driving the semiconductor components on a module-specific basis, and an interface, which is driven by a memory controller assigned to the memory module via the interface bus and accesses the semiconductor components via the serial line. During normal operation, it is possible to test and adjust the semiconductor components in proximity to the application and on a chip-specific basis via the interface.

22 Claims, 2 Drawing Sheets

MEMORY ARRANGEMENT IN A COMPUTER SYSTEM

CROSS REFERENCE TO RELATED APPLICATIONS

This application claims priority under 35 USC §119 to German Application No. 10335132.9, filed on Jul. 31, 2003, and titled "Memory Arrangment in a Computer System," the entire contents of which are hereby incorporated by reference.

FIELD OF THE INVENTION

The present invention relates to a memory arrangement having a memory module with semiconductor components which are arranged on the memory module, can be operated in parallel and are additionally connected to one another via a serial line, and having an interface via which the semiconductor components can be tested and adjusted in proximity to the application and on a chip-specific basis.

BACKGROUND

For the purposes of operation and in order to store information, computer systems and mainframes have a memory arrangement comprising a multiplicity of memory modules which are arranged, for example, in memory cabinets and have semiconductor components grouped on the memory modules.

Semiconductor components, for example, DRAMs (Dynamic Random Access Memories), are generally subject to extensive function tests early in the production process before final assembly to form a memory module. These function tests are used to identify faulty memory cells or faulty column lines or row lines or generally faulty circuit parts in the semiconductor components. To this end, data values are written to memory cells in a memory cell array in the semiconductor component and are then read out again in order to be compared with the prescribed data values. This makes it possible to test the semiconductor components under various operating conditions in order to guarantee fault-free operation of the memory chip.

The memory modules accommodate a test device, a "BIST" (Built-In Self-Test) unit, in each of the semiconductor components as part of the latter. The BIST unit integrated in the respective semiconductor component carries out the requisite electrical function tests before the semiconductor components are installed. The BIST unit has a BIST controller which, as a switching region in the semiconductor component, is in the form of an ASIC (Application-Specific Integrated Circuit). Commands in a test sequence which are issued by the BIST controller are forwarded to the semiconductor component, with the BIST controller monitoring and evaluating the execution of the commands. The data transmitted by the semiconductor component regarding its operating states are output, for example, to external test systems which make an appropriate evaluation on the basis of which it is possible to make a statement regarding whether and, if appropriate, which memory areas are not functioning as intended. When the tests are carried out successfully, the module is classified as functional and is used in the customer's target application.

However, a meaningful test result can only be achieved when the semiconductor component is tested at the operating frequency that it has during normal operation. A fault in a semiconductor component is always associated with the target application, for example, a voltage supply or an input parameter for configuring the semiconductor component is not within the prescribed specification.

However, today's test methods do not yet make it possible to simulate these or all characteristic operating modes of the application in order to test the semiconductor components in proximity to the application. It is thus not possible to make a statement regarding whether the semiconductor components tested during production will run through all of the operating modes, occurring during later application without any faults.

In the event of a fault occurring during normal operation at the customer's premises, the memory module has to be returned to the manufacturer for the purposes of analysis. Identification data which may have been programmed in, for example the chip ID, test data or adjustment parameters, can thus be used only for subsequent historical tracking, but not for user-specific adjustment during normal operation.

At such a point in time it would be desirable, for the purposes of evaluation and/or analysis, to use a test system which would make it possible to test and adjust the semiconductor components during normal operation. Today's available external test systems are connected to the semiconductor components on a memory module via the semiconductor component's standard interface, which is used for external data interchange, address interchange and/or command interchange during normal operation. In the test mode, the test system is able to generate the test commands required to test the memory module, such as control and address commands, commands for reading and storing data words and also a clock signal, and is able to initiate the electrical function test via the BIST unit, for example. In the case of semiconductor components which can be operated in parallel, however, this function test may usually be carried out only for all chips, that is, all of the semiconductor components arranged on the memory module are tested in parallel at the same time via the standard interface.

The desire for remote access monitoring and a fault analysis capability for computer systems, i.e., driving the computer systems via an external test system, has existed since computer systems were networked. One difficulty in checking individual hardware components in a computer system is based on the fact that respective redundancy must be available for faulty components.

For example, an apparatus for the remote monitoring of computer components in a computer system is known, but this apparatus explicitly requires a working memory in the computer system. In order to analyze a processor in a computer system, a remotely accessible integrated debug environment has been proposed, wherein a computer which is connected to the computer system via the Internet can analyze the processor in the event of a fault. Further, a method for remotely accessing a faulty booting computer is known, in which the computer, in the event of a failed starting attempt, has recourse to a simple E-BIOS code which connects the computer to a service computer via a LAN or an Internet connection and thus makes the computer accessible for remote access operations for the purpose of repair and/or diagnosis. A known method for testing an SDRAM in a computer system, including test modules integrated in the computer system, tests the memories before starting by appropriate test modes in order to boost or attenuate a possible fault mode.

In addition, there is known a semiconductor module having semiconductor components which are arranged on the semiconductor module and are connected to one another via a serial line and having an interface which accesses the semiconductor components via the serial line.

However, remote access maintenance of memory modules during normal operation has not been disclosed. To this end, it would be necessary to operate the computer system normally and to carry out specific addressing operations during an application.

A memory arrangement which makes it possible to drive the semiconductor components (arranged on the memory arrangement) during normal operation using remote access and to test and adjust them in proximity to the application without impairing the operation of the semiconductor components is desirable.

SUMMARY

The memory arrangement in accordance with the invention can have at least one memory module with semiconductor components. The semiconductor components can be arranged on the memory module, can be operated in parallel, and can be additionally connected to one another via a serial line. There can also be an interface which can be driven by a memory controller assigned to the memory arrangement. The interface can be connected to the serial line of the semiconductor components such that the interface makes it possible to access the semiconductor components on a chip-specific basis.

With such a memory arrangement during normal operation, a test system (which uses remote access to access the memory arrangement in the computer system) can test and adjust the semiconductor component in proximity to the application and can carry out maintenance, servicing, repair or evaluation on the semiconductor component. In this case, the computer system may be remotely accessed and connected to the external test system by, for example, a WAN or LAN connection.

In order to intentionally transmit, to the semiconductor components, the control and address commands which have been initiated by the test system, have been applied to a memory controller assigned to the memory modules and have been forwarded to the interface, the interface can have a circuit arrangement, which can convert the applied control and address commands, i.e., the "input code", into corresponding serial signals. These serial signals can then be passed via the serial line through the semiconductor components connected to the serial line. The result signals, i.e., the data returned by the semiconductor components, may be stored in the interface until the data are requested or read out by the memory controller.

According to the invention, use of the interface during normal operation can provide the option of transmitting test sequences which can activate a BIST unit which can be assigned to the semiconductor component and intended for configuring and testing the semiconductor component. To this end, the BIST unit can retrieve and execute desired program code stored in a programmable non-volatile memory with boot-up sequences which have been implemented using program code and can use a sequence-specific boot parameter set to test and configure the semiconductor components and to set a fault-free operating mode being executed when the memory arrangement is restarted, for example. As the program code is executed further, an internal interface may be used to transmit test modes, which can test the semiconductor component during normal operation and request operating states and parameters. The operating states and parameters can be evaluated and processed by the BIST unit with the BIST unit storing the processed parameters as boot, test, and/or operating parameters in its programmable non-volatile memory so that the parameters may be used, when restarting or testing during normal operation, for adjustment in proximity to the application. These parameters may, of course, likewise be retrieved and output via the interface such that the standard interface is not affected and the operation of the semiconductor component is not impaired.

Together with the conditions known from production and also the current test conditions, the memory arrangement can afford the capability of specifying faults in a relatively unambiguous manner and initiating corrective measures.

New programs for the test unit, firm updates, function tests, or parameters for adjusting the semiconductor component may be loaded via the interface without disruption and in parallel with operation.

In order to ensure access control, a computer system provided with memory modules to be tested may be provided with a program which allows only authorized test systems and authorized persons to log onto the computer system.

For testing and adjustment, the at least one memory module can be addressed via the interface-bus-compatible interface, for example, an SDRAM interface bus. The interface can have the characteristic of converting an SDRAM stimulus into a serial remote access command. Through a memory management function in the computer system a particular memory area can be allocated, for example, to the interface so that the interface can operate separately from the rest of the memory area and can use a hardware-orientated program which is integrated in the memory arrangement to access the memory area. The activation patterns generated by the interface's circuit arrangement may be used by the interface to access the memory area, as is usually effected by the memory controller.

If the memory arrangement has a plurality of memory modules, the semiconductor components can be driven as a function of the serial connection of the memory modules to the interface with the connection being routed to the interface either individually in the form of a module-specific line or in the form of a line which connects the memory modules and the semiconductor components thereon.

The functionality of the interface can be integrated into the memory controller so that the memory controller can be connected directly to the serial line or lines in the memory modules and can drive the semiconductor components directly using serial signals.

BRIEF DESCRIPTION OF THE FIGURES

The invention is explained in more detail below with reference to the figures which are shown in the drawings, in which.

DETAILED DESCRIPTION

Figure 1:
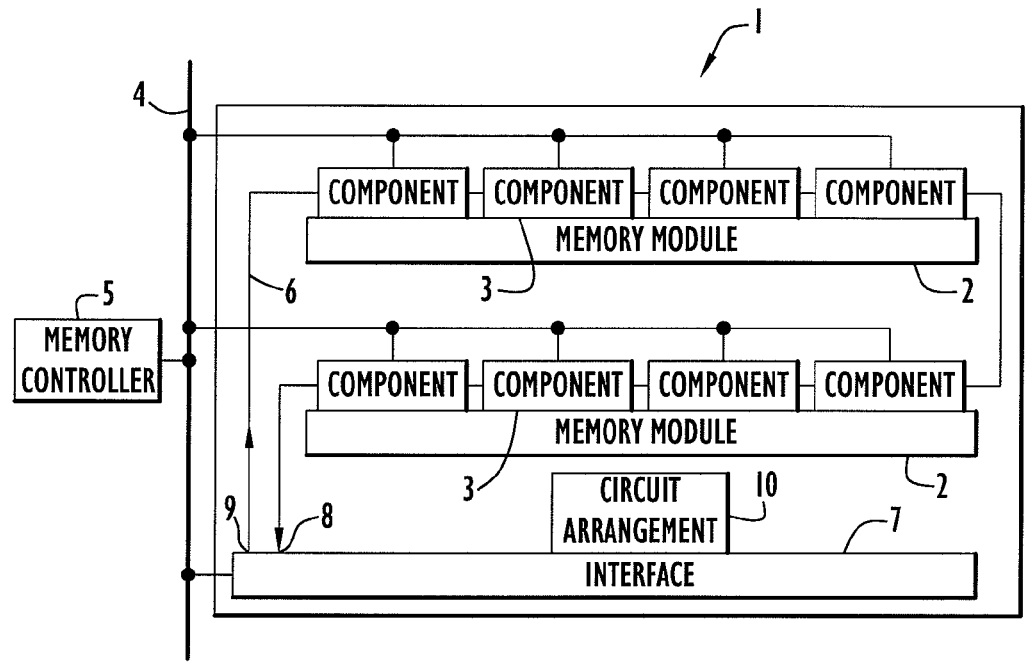
FIG. 1 shows a schematic illustration of an inventive memory arrangement.

FIG. 1 shows a schematic illustration of an inventive memory arrangement. The memory arrangement 1 can have two memory modules 2 with semiconductor components 3, which can be arranged on the memory modules 2. In this exemplary embodiment, the semiconductor components 3 can be operated in parallel via an interface bus 4. A memory controller 5 for driving the memory modules 2 assigned to it can be provided on the interface bus 4. The semiconductor components 3 on the memory modules 2 can be connected to one another in intermodular fashion via an additional serial line 6. An interface 7, which can contact the interface bus 4, can have an input connection 8 and an output connection 9 to which the start and end of the serial line 6 are connected.

In order to test and adjust the semiconductor components 3 in proximity to the application, a test system (not shown here) may use remote access to access the memory modules via the memory controller and to initiate function tests and transmit test modes. An input code for the test system, which can be forwarded to the interface 7 via the memory controller 5, can be converted into a serial signal by a circuit arrangement 10 arranged on the interface 7 and can be applied, via the output connection 9, to the serial line 6 in order to be serially driven through each semiconductor component 3 arranged on the memory modules 2. In this case, the serial signal can be forwarded from one semiconductor component 3 to the next. Each semiconductor component 3 can output parameters by appending a binary-coded result to the serial signal. The serial signal may cause the semiconductor component 3 to output chip-specific parameters, as described previously, or to activate a BIST unit (not shown here), which can be assigned to the semiconductor component 3, can test and configure the semiconductor component 3 during normal operation, can ascertain and process operating states, and can use the operating states further for chip-specific adjustment. The parameters output by the semiconductor components 3 can be received via the input connection 8 and can be stored on the interface 7 until retrieved by the memory controller 5.

Figure 2:
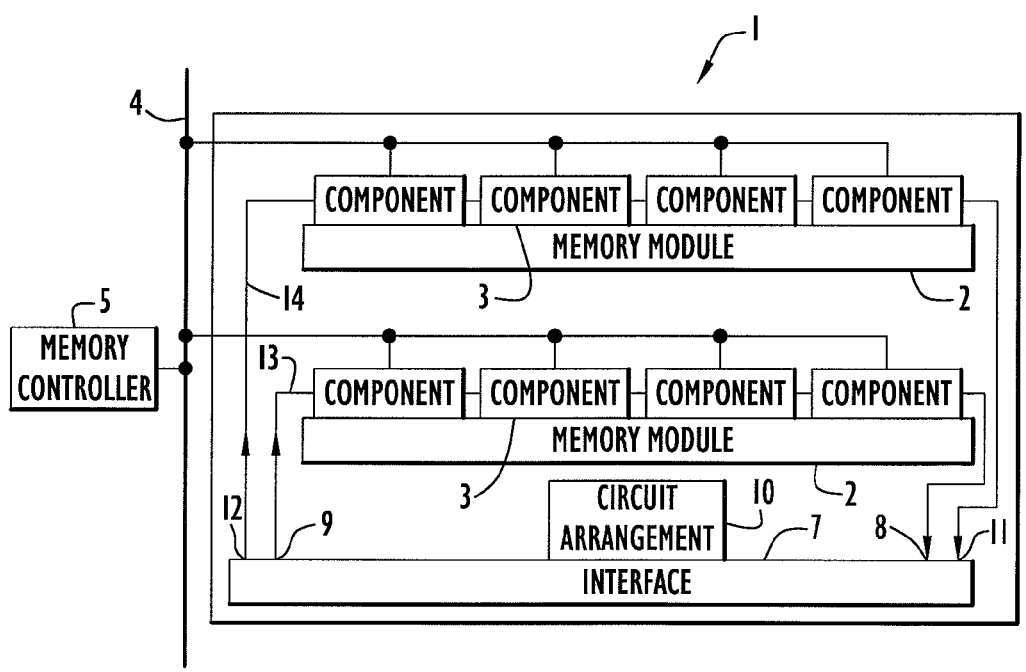
FIG. 2 shows a further embodiment of the memory arrangement shown in FIG. 1.

FIG. 2 shows a further embodiment of the memory arrangement shown in FIG. 1. The memory modules 2 are operated in the same manner as described previously by the memory controller 5 via the interface bus 4 for data, address and/or command interchange. The semiconductor components 3 arranged on the memory modules 2 can be connected by module-specific serial lines 13, 14 that a serial signal can be applied to the serial line 13 via the output connection 9 and can be driven through the semiconductor components 3. A corresponding result code can be received at the input connection 8 of the interface 7. The same applies to the serial line 14, which is used to drive a serial signal from an output connection 12 on the interface 7 and to receive a result code at the input connection 11 on the interface 7.

Figure 3:
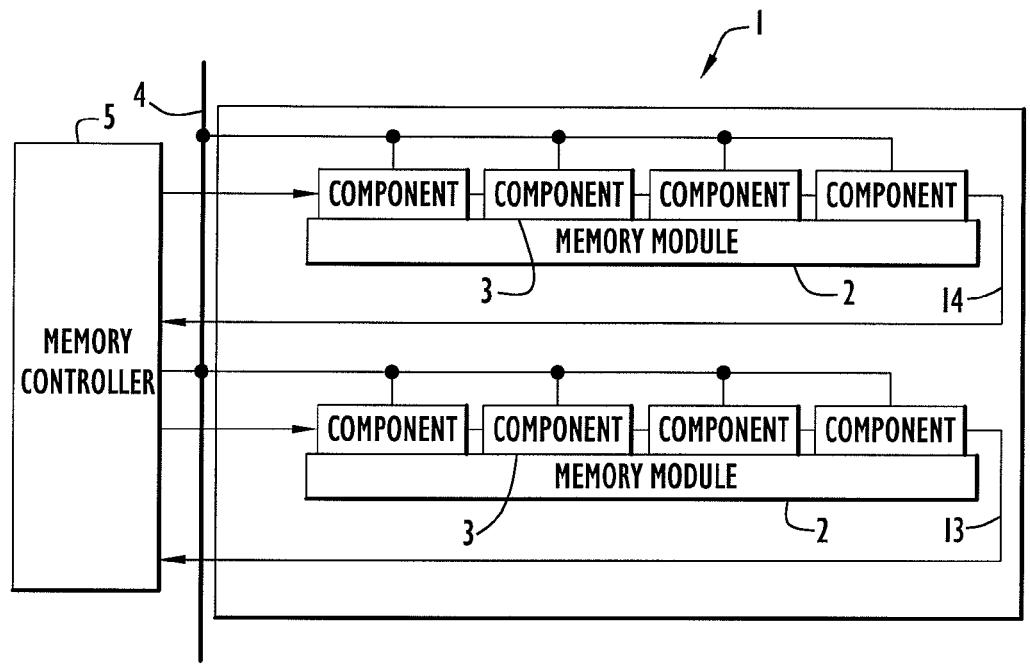
FIG. 3 shows a schematic illustration of a further inventive memory arrangement.

In the exemplary embodiment shown in FIG. 3, the serial lines 13, 14, which connect the semiconductor components 3 can be routed directly to the memory controller 5, which can drive the semiconductor components 3 via the serial lines 13, 14 independently of the interface bus 4 and thus in parallel with normal operation.

Figure 4:
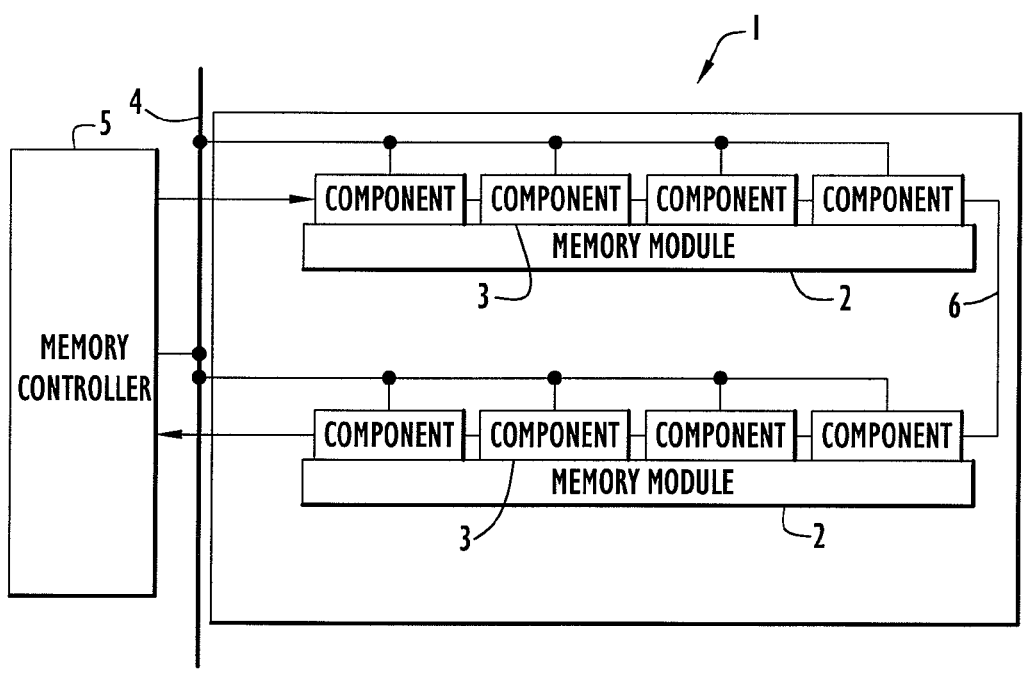
FIG. 4 shows a further embodiment of the memory arrangement shown in FIG. 3.

In FIG. 4, the semiconductor components 3 on the memory modules 2 can be connected to one another in intermodular fashion via the serial line 6 with the serial line 6 likewise being connected directly to the memory controller 5 and with it being possible for the semiconductor components 3 on the memory module 2 and on the further memory module 2 to be driven successively by the memory controller 5 via this serial line 6.

The present invention allows serial unidirectional communication between semiconductor components (grouped on memory modules) independently of the parallel operating mode via the interface bus. All parameters may be output by the semiconductor components (which are connected in series with one another) and may be evaluated, during normal operation, by the memory controller or by a test system connected to the computer system remotely. General or company-specific parameters may thus be requested, and/or general or company-specific chip-specific configuration and adjustment operations may be carried out, completely independently of the current operating mode of the semiconductor components which are operated in parallel.

The above description of the exemplary embodiments in line with the present invention serves merely for illustrative purposes and not to limit the invention. The invention allows various changes and modifications without departing from the scope of the invention and its equivalents.

LIST OF REFERENCE SYMBOLS

1 Memory arrangement
2 Memory module
3 Semiconductor component
4 Interface bus
5 Memory controller
6 Serial line
7 Interface
8 Input connection
9 Output connection
10 Circuit arrangement
11 Input connection
12 Output connection
13 Serial line
14 Serial line

What is claimed is:

1. A memory arrangement, comprising:
at least one memory module with semiconductor components operating in parallel and being connected to one another via a serial line;
an interface bus for driving the semiconductor components on a module-specific basis; and
an interface driven by a memory controller, assigned to the memory module via the interface bus, the interface coupled to the semiconductor components via the serial line for access, wherein, during normal operation, the interface tests and adjusts the semiconductor components by sending signals to the semiconductor components via the serial line.

2. The memory arrangement according to claim 1, further comprising:
a test system connected to the computer system via a remote connection to test and adjust the semiconductor components via the interface.

3. The memory arrangement according to claim 2, wherein the remote connection is a LAN or WAN connection.

4. The memory arrangement according to claim 1, wherein the interface comprises a circuit arrangement for converting an input code applied to the interface into serial signals which are passed via the serial line through the semiconductor components connected to the serial line and for receiving a result signal.

5. The memory arrangement according to claim 4, wherein the serial signals initiate parameter requesting, configuration, and/or adjustment of an operating mode of the semiconductor components in order to ascertain and output the result signals.

6. The memory arrangement according to claim 4, wherein the circuit arrangement is an ASIC.

7. The memory arrangement according to claim 4, wherein the circuit arrangement stores the result signals which have been ascertained and/or forwards them to the memory controller.

8. The memory arrangement according to claim 4, wherein each semiconductor component comprises an associated flexibly programmable test unit, the test unit, on the basis of the serial signals supplied to the semiconductor component via the serial connection, transmitting test modes for ascertaining test data on the semiconductor component, processing the test data, using the test data for further boot and/or test operations during normal operation in order to adjust the semiconductor component in proximity to application, and forwarding the test data as result signals to the interface for output.

9. The memory arrangement according to claim 4, wherein the test unit in the semiconductor components is programmable via the interface.

10. The memory arrangement according to claim 1, further comprising:
at least one further memory module with semiconductor components operated in parallel and connected to one another via a serial line, the semiconductor components of the memory module and the semiconductor components of the at least one further memory module being driven in parallel via the serial lines.

11. The memory arrangement according to claim 1, further comprising:
at least one further memory module, wherein the serial line is looped through the at least one further memory module such that the semiconductor components on the memory module and on the at least one further memory module are connected to one another in series.

12. The memory arrangement according to claim 1, wherein the interface is integrated in the memory controller and the memory controller is connected directly to the serial line that connects the semiconductor components on the memory module.

13. The memory arrangement according to claim 1, wherein the interface comprises an interface card supported by the memory controller.

14. The memory arrangement according to claim 9, wherein the test unit is programmed with firmware or function tests.

15. A memory device, comprising:
at least one memory module with semiconductor components mounted thereon and operating in parallel;
an interface bus coupling the semiconductor components in parallel to a memory controller for driving the semiconductor components in parallel during normal operation of the memory device;
a serial line interconnecting the semiconductor components in series; and
an interface configured to send a serial signal to the semiconductor components via the serial line, the serial signal being forwarded from one semiconductor component to a next semiconductor component in sequence, wherein the serial signal causes at least one of the semiconductor components to output operational information, perform a test, or make operational adjustments.

16. The memory device of claim 15, wherein the serial signal is supplied to the semiconductor components during normal operation of the memory device.

17. The memory device of claim 15, wherein the serial line is unidirectional and the interface is coupled to the serial line at a point before a first of the semiconductor components in a series and at a point after a last of the semiconductor components in the series.

18. The memory device of claim 17, wherein the semiconductor components supply data to the interface by appending the data to the serial signal.

19. The memory device of claim 15, wherein the at least one memory module comprises a plurality of memory modules, and the semiconductor components of at least two of the memory modules are serially interconnected via the serial line.

20. The memory device of claim 15, wherein the at least one memory module comprises a plurality of memory modules, and the memory device comprises a plurality of serial lines respectively corresponding to the memory modules, wherein an individual serial line serially interconnects the interface and the semiconductor components of an individual memory module.

21. The memory device of claim 15, wherein the interface is capable of controlling semiconductor components on an individual basis via the sePal signal.

22. The memory device of claim 15, wherein the memory controller supplies an input signal to the interface and the interface converts the input signal into the serial signal for transmission to the semiconductor components via the serial line.

* * * * *

UNITED STATES PATENT AND TRADEMARK OFFICE
CERTIFICATE OF CORRECTION

PATENT NO. : 7,313,732 B2 Page 1 of 1
APPLICATION NO. : 10/902160
DATED : December 25, 2007
INVENTOR(S) : Martin Perner It is certified that error appears in the above-identified patent and that said Letters Patent is hereby corrected as shown below:

Col. 8, l. 39: "sePal" should read --serial--

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,313,732 B2 | Page 1 of 1 |
| APPLICATION NO. | : 10/902160 | |
| DATED | : December 25, 2007 | |
| INVENTOR(S) | : Martin Perner | |

It is certified that error appears in the above-identified patent and that said Letters Patent is hereby corrected as shown below:

Column 8, line 40: change "sePaI" to -- serial --.

Signed and Sealed this

Twenty-seventh Day of January, 2009

JOHN DOLL
*Acting Director of the United States Patent and Trademark Office*